United States Patent [19]

Costes

[11] Patent Number: 4,671,922

[45] Date of Patent: Jun. 9, 1987

[54] NUCLEAR REACTOR COOLED BY A LIQUID METAL

[75] Inventor: Didier Costes, Paris, France

[73] Assignee: Commissariat a l'Energie Atomique, Paris, France

[21] Appl. No.: 613,767

[22] Filed: May 24, 1984

Related U.S. Application Data

[63] Continuation of Ser. No. 331,825, Dec. 17, 1981, abandoned.

[30] Foreign Application Priority Data

Dec. 30, 1980 [FR] France .............................. 80 27759

[51] Int. Cl.⁴ ........................ G21C 11/00; G21C 13/00
[52] U.S. Cl. .................................. 376/285; 376/289; 376/290; 376/293; 376/404; 376/461; 376/281
[58] Field of Search ........................ 376/290, 403–405, 376/289, 285, 360, 461, 287, 293, 280, 281

[56] References Cited

U.S. PATENT DOCUMENTS

| | | | |
|---|---|---|---|
| 2,961,393 | 11/1960 | Monson | 376/404 |
| 2,977,297 | 3/1961 | Evans et al. | 376/287 |
| 3,009,867 | 11/1961 | Kinsey | 376/287 |
| 3,080,308 | 3/1963 | Dickinson | 376/289 |
| 3,186,913 | 6/1965 | Weisner et al. | 376/289 |
| 3,466,227 | 9/1969 | Finch | 376/287 |
| 3,719,558 | 3/1973 | Leclou | 376/404 |
| 3,764,468 | 10/1973 | Hind | 376/290 |
| 3,822,186 | 7/1974 | Rajakovics | 376/289 |
| 3,888,730 | 6/1975 | Jackson | 376/290 |
| 3,893,886 | 7/1975 | Aubert et al. | 376/404 |
| 3,988,202 | 10/1976 | Costes | 376/289 |
| 3,990,941 | 11/1976 | Scholz | 376/293 |
| 4,061,534 | 12/1977 | Jackson | 376/289 |
| 4,069,101 | 1/1978 | Mangus | 376/403 |
| 4,072,561 | 2/1978 | Friedrich | 376/280 |
| 4,087,325 | 5/1978 | Chevallier et al. | 376/405 |
| 4,186,049 | 1/1980 | Blum et al. | 376/404 |
| 4,351,794 | 9/1982 | Artaud et al. | 376/405 |

FOREIGN PATENT DOCUMENTS

| | | |
|---|---|---|
| 0018262 | 10/1980 | European Pat. Off. . |
| 2535378 | 2/1977 | Fed. Rep. of Germany ...... 376/403 |
| 1483407 | 4/1967 | France . |
| 2002531 | 10/1969 | France . |
| 2119834 | 8/1972 | France . |
| 2246941 | 5/1975 | France . |
| 2326011 | 4/1977 | France . |
| 964841 | 7/1964 | United Kingdom . |
| 1299192 | 12/1972 | United Kingdom . |
| 2000356 | 1/1979 | United Kingdom . |

Primary Examiner—Harvey E. Behrend

[57] ABSTRACT

The invention relates to a nuclear reactor cooled by a liquid metal comprising a vessel (12) containing the reactor core (24), a vessel shaft (18) and a sealing slab (14).

The bottom (12a) of the vessel rests on the bottom (52) of the vessel shaft via supports (54) defining between the said two bottoms a space (56) in which circulates a cooling fluid such as air. A skirt (74) surrounds vessel (12) and rests on the vessel shaft bottom (52) for supporting slab (14).

Application to the construction of simpler and less expensive fast neutron reactors than those hitherto known.

15 Claims, 1 Drawing Figure

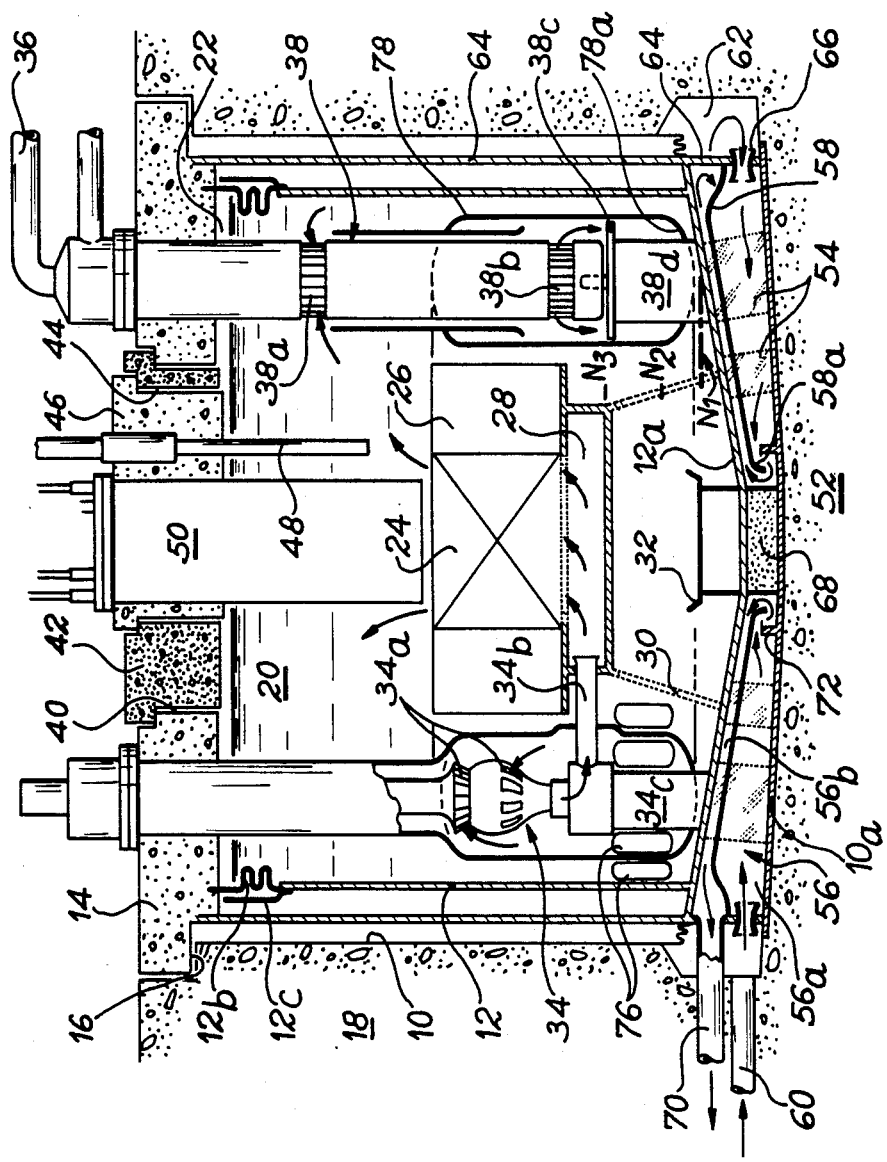

NUCLEAR REACTOR COOLED BY A LIQUID METAL

This application is a continuation of application Ser. No. 331,825, filed Dec. 17, 1981, now abandoned.

BACKGROUND OF THE INVENTION

The present invention relates to a nuclear reactor cooled by a liquid metal and more specifically relates to supporting the liquid metal-filled vessel and the contained reactor core.

It is known that for the purpose of providing biological protection the vessel of a fast neutron nuclear reactor is placed in a concrete vessel shaft and its upper part is sealed by a metal slab, whose gaps and openings are filled with concrete. In solutions used on the Rhapsodie, Phénix and Super Phénix reactors, the slab rests on an annular bearing surface formed in the upper part of the vessel shaft and the vessel is directly suspended on said slab. The vessel is filled with a primary liquid metal such as sodium, which cools the reactor core by transferring the heat given off in the reactor core to exchangers in which a secondary fluid circulates, which is generally also sodium. The circulation of the liquid metal in the core and in the exchangers is brought about by pumps. The primary sodium temperature is close to 540° C. at the outlet from the core, i.e. in the upper part of the vessel, whilst it drops to about 400° C. at the outlet from the exchangers, i.e. in the lower part of the vessel.

Hereinafter the term "hot" corresponds to the temperature of the liquid metal leaving the core, the term "tepid" to the temperaure of the liquid metal leaving the exchangers and reentering the core and the term "cold" to a temperature close to ambient temperature, but which may for example reach the fusion temperature of the liquid metal, i.e. approximately 100° C. for sodium.

In the best known constructions the reactor vessel is suspended from the upper slab and transmits to it a considerable load. To prevent excessive creep of the upper part of the vessel walls, it is necessary to cool the same by circulating tepid sodium along the said walls. This leads to a certain thermodynamic loss and this arrangement also requires the use of baffles which are difficult to construct. In addition, suspended vessel are to a certain extent sensitive to possible seismic movements.

It has also been previously proposed to place the tepid vessel bottom on the bottom of the cold vessel shaft by means of distributed supports permitting radial differential expansion movements. These supports have, for example, been constituted by rollers or rods, or even Stellite or graphite blocks. This solution has not been adopted because it did not appear to offer sufficient reliability.

Another solution which has in fact been used consists of supporting the tepid bottom vessel in its lower peripheral part by radially displaceable supports. The supports then receive high individual stresses, but can be more easily inspected. However, compared with suspended vessels there is a need to radially transfer internal loads.

BRIEF SUMMARY OF THE INVENTION

The present invention relates to the construction of a fast neutron nuclear reactor in which the support procedure adopted for the vessel makes its manufacture easier and less expensive than that of the aforementioned, known solutions. In addition, said vessel has safety and reliability characteristics which are at least as good as those of existing vessels.

Therefore the present invention proposes a nuclear reactor cooled by a liquid metal comprising a liquid metal-filled vessel, which contains the reactor core, a sealing slab sealing off the upper part of the vessel and a vessel shaft in which the vessel is located, wherein the bottom of the vessel rests on the bottom of the vessel shaft, wherein means are provided for cooling the bottom of the vessel to a temperature close to ambient temperature and wherein the inner areas of the vessel traversed by a forced flow of liquid metal are entirely positioned above a horizontal limiting plane which, at the transition height between said plane and the bottom of the vessel, leads to a thermal stratification of the liquid metal and consequently to an appropriate limitation of the thermal stresses in the vessel walls and the internal structures. Preferably the transition height is equal to at least 1/10 of the vessel diameter.

The use of a cold vessel bottom makes it possible to support the vessel and all the internal loads on the vessel shaft bottom by means of supports which are very simple because they are submitted to low thermal gradients and stresses. Preferably the space formed between the vessel shaft bottom and the vessel bottom and which is traversed by the supports is used for the circulation of a fluid for cooling the vessel bottom. This space can also be vertically divided into a lower space ensuring a centripetal circulation of the fluid and an upper space ensuring a centrifugal circulation in contact with the vessel bottom, the two spaces being separated by a fairing which can have detachable parts to facilitate inspection. The vessel supports traverse this fairing. The two spaces are able to communicate in the vicinity of the vessel axis by a baffle which can be filled with liquid metal in the case of a leak, stopping the circulation of the cooling fluid which is liable to react with the liquid metal.

In order to limit shape defects and faults during the construction of the vessel shaft bottom and the vessel bottom and in order to permit the centering of the vessel resting by gravitation on its supports, a substantially conical, downwardly pointing shape is advantageously chosen for the two bottoms.

The transition height corresponding to the temperature gradient at the vessel bottom leads to a heat loss, which is acceptable in a high power reactor. However, this loss can be reduced by placing within the said transition height thermal insulating inclusions having a thermal conductivity below that of the liquid metal, so as to limit the downward heat flux over the said height.

Finally, in view of the fact that the vessel rests on the vessel shaft bottom, the connection between the upper part of the vessel and the slab merely serves to seal the primary confinement area, whilst permitting expansions of the vessel. To this end the vessel side wall can be connected to the slab via an expansion bellows with bending corrugations.

DESCRIPTION OF THE DRAWING AND PREFERRED EMBODIMENTS

An embodiment of the invention will be described in greater detail hereinafter relative to the single drawing which is a diagrammatic vertical section showing a fast neutron nuclear reactor, whose vessel and its cold bottom are arranged in accordance with the teachings of the present invention.

In per se known manner the fast neutron nuclear reactor, whose integrated primary circuit is shown in the drawing, comprises a concrete reactor building defining a vessel shaft 10 within which is placed a main vessel 12 having a vertically axed cylindrical configuration. The upper end of this vessel 12 is sealed by a concrete-filled metal slab 14. Still in per se known manner the main vessel 12 is filled with liquid sodium 20 and in the vicinity of slab 14 the liquid sodium is surmounted by a layer 22 of neutral gas, such as argon. The main vessel 12 also contains the reactor core 24, which is constituted by fuel assemblies containing the nuclear fuel, whose fission gives off the thermal energy of the reactor, together with the lateral neutron protection 26 surrounding core 24. Core 24 and the lateral protection 26 are supported by a cross-member or diagrid 28 which rests on the bottom 12a of main vessel 12 via a skirt 30. Also in per se known manner a stop plate 32 rests on the bottom 12a of the main vessel below core 24 for collecting the products resulting from a possible fusion of the core.

In the represented constructional variant relating to an integrated fast neutron nuclear reactor, the primary circuit is housed within the main vessel 12. Thus, the circulation of the sodium 20 in core 24 required for the extraction of the heat produced in the latter by the fissible reaction is controlled by pumps 34 placed within the vessel 12, only one of the said pumps being shown in the drawing. In the same way the transmission to a secondary sodium circuit 36 of part of the heat extracted in this way from core 24 by primary sodium 20 is brought about by intermediate exchangers 38, which are also arranged within vessel 12 and whereof only one is shown in the drawing. In per se known manner pumps 34 and exchangers 38 are suspended on slab 14.

Still in per se known manner in the central part of concrete slab 14 there is an opening 40 which receives a first rotary plug 42, which is itself perforated by an opening 44 off-centred relative to opening 40 and which receives a second rotary plug 46. Rotary plug 46 carries at least one transfer arm 48 making it possible to handle the assemblies of core 24, the lateral neutron protection 26 and a core cover 50 carrying the control rods and various control and measuring instruments.

According to the present invention bottom 12a of main vessel 12 rests by gravity on the concrete lower foundation or bottom 52 of vessel shaft 10, which is lined with a protective and distribution sheet 10a via supports 54, which are regularly distributed in order to define a space 56 between bottoms 12a and 52. In the represented embodiment this space 56 is used for providing an air cooling circuit making it possible to cool the bottom 12a of main vessel 12. To this end space 56 is vertically subdivided into a lower space 56a and an upper space 56b by a fairing 58. The preferably pulsed cooling air emanating, for example, from a not shown heat exchanger is carried by at least one radial intake pipe 60 traversing the wall 18 of the vessel shaft into a collector ring 62 defined between the latter and a cylindrical skirt 64 positioned between the periphery of bottom 12a and bottom 52 and serving to support slab 14, as will be shown hereinafter. Collector ring 62 is linked with the lower space 56a by passages 66, in such a way that in the lower space there is a radial centripetal air flow. With a ferrule 68 positioned below stop plate 32 between bottoms 12a and 52, fairing 58 defines an annular space linking lower space 56a with upper space 56b. Thus, in the latter there is a radial centrifugal flow of cooling air, which is accelerated due to the very limited width of space 56b. At its outer periphery, upper space 56b is widened in order to define an annular outlet collector connected to the aforementioned cooling exchanger by at least one radial outlet pipe 70 traversing wall 64 and wall 18.

In order to permit the circulation of the cooling air in space 56, supports 54 are constituted in the present case by radial steel screen-like members. However, according to a not shown variant, they may also be constituted by tubular steel columns.

Preferably fairing 58 is constructed from detachable elements permitting possible inspections and repairs of the bottom 12a of vessel 12 by circulating in space 56 between supports 54. To this end space 56 can be made accessible on shutdown.

For safety reasons which will be apparent from the remainder of the description, in the manner shown in the drawing a cylindrical ferrule 72 can be provided, which is sealingly connected to the bottom 52 of the vessel shaft in lower space 56, the innr peripheral edge 58a of fairing 58 being inwardly and downwardly curved between ferrules 68 and 72 in such a way that the upper edge of ferrule 72 is above the lower edge of part 58a.

Moreover, ferrule 68 is preferably filled with refractory oxide such as MgO or $UO_2$, selected in a manner independent of the invention for slowing down or stopping the descent of molten materials in the case of an accidental fusion of the core and in the case of the perforation of the bottom of stop plate 32 and the bottom 12a of the vessel.

As indicated hereinbefore the cooling air circuit is pulsed in normal operation by means of a not shown fan. However, this circuit is preferably designed so as to be able to operate under natural circulation conditions with increased temperature variations if the said fan fails. For this reason and for another reason which will be apparent hereinafter, the remainder of the cooling circuit is placed at a higher level than space 56.

Obviously the bottom 12a of main vessel 12 could be cooled by any other known means and in particular by tubes placed in direct contact with bottom 12a and in which a liquid such as water could circulate. In the same way the cooling air could be replaced by any other gas.

In order to limit shape faults during the construction of the vessel shaft bottom and the bottom of vessel 12 and ensure supporting with overall embedding of the vessel on supports 54 without rolling between the said components being necessary, the bottom 12a of the vessel and the bottom 10a of the vessel shaft preferably have a conical shape, as illustrated in the drawing. The side wall of vessel 12, constituting for example a vertical cylinder, is welded to the vessel bottom 12a and in the upper part forms one or more bellows corrugations 12b preferably placed below the free sodium level 20. Moreover, these bellows corrugations 12b can be duplicated outside the vessel by a guard ring 12c, whose lower part is welded to vessel 12 and whose upper free edge is placed above the free sodium level 20 in order to prevent the latter escaping from the main vessel if the bellows corrugations 12b fractured. Due to these corrugations the vessel side wall is only subject to limited vertical stressing and is subject only to limited creep, thereby obviating its difficult "air conditioning" by baffles.

The thus formed vessel is surrounded by cylindrical skirt 64, which is extended above the vessel bottom 12a up to slab 14 for supporting the same and as shown in the drawing. The junction between the vessel bottom 12a and skirt 64 makes it possible to separate the cooling circuit of the bottom and the lateral space between the vessel and the skirt, which is also thermally insulated by means which are independent of the invention. If a very serious accident occurs leading to overheating of the skirt 64 and creep of the latter, slab 14 would rest by its edge 64 on concrete walls 18.

A temperature of e.g. 100° C. occurs in the upper horizontal plane $N_1$ of the cooled vessel bottom 12a and a temperature of e.g. 400° C. (tepid) in a horizontal plane $N_3$ at the lower level of the areas of forced circulation of the tepid sodium in the vessel, to be defined hereinafter. Between planes $N_1$ and $N_3$ the sodium is immobilized by thermal stratification with freezing in its lower part. In the case of a vessel diameter of 20 m it is possible to adopt a height $N_1-N_3$ of approximately 2.5 m leading to a heat loss of approximately 4 MW. Such a loss is acceptable with a medium or high power reactor. However, it can be reduced either by increasing height $N_1-N_3$, or by placing in the sodium area between levels $N_1$ and $N_3$ and more specifically between level $N_3$ and an intermediate level $N_2$, thermally insulated inclusions 76, which may be formed by stainless steel-sheathed magnesia blocks or gas-sealed boxes. Thus, by using e.g. inclusions forming columns lining 80% of the vessel cross-section, the heat losses are limited to approximately 1.5 MW for a diameter 20 m vessel. The gas boxes have the advantage of collapsing in the case of an accidental overpressure, thus limiting the consequences. However, it is pointed out that the intention of using inclusions 76 is not to reduce to a minimum the sodium cross-sections between the columns. It is in fact necessary for the heat to continue to flow very homogeneously over the transition height $N_1-N_3$ in thermal gradient in order to ensure a regular temperature range, thereby limiting thermal stresses in the vessel walls and the other structures.

In order to ensure a regular temperature range in the bottom of vessel 12, sodium 20 is maintained in the static state in zone $N_1-N_3$. To this end pumps 34 and exchangers 38 are totally placed above the upper level $N_3$ in such a way that the hot liquid sodium emanating from the upper part of core 24 penetrates the heat exchangers 38 by openings 38a formed between core 24 and slab 14, i.e. very substantially above level $N_3$. Moreover, the tepid liquid metal leaving exchangers 38 by openings 38b formed in the lower part of the latter issues into a tepid annular collector 78 surrounding core 24 and its neutron protection 26. Metal screens such as 38c limit the forced circulation area below level $N_3$. The pumps 34 are also arranged within collector 78. The pumps remove the tepid sodium contained in collector 78 by intake ports 34a in order to directly reinject it into the lower part of core 24 by discharge pipes 34b communicating with the diagrid 28. Thus, although the lower part of collector 78 containing is placed within the thermal gradient zone $N_1-N_3$, the sodium 20 within said zone, both inside and outside collector 78 remains static. Obviously the two vertical walls of annular collector 78 form cylindrical shells, which are exposed to the thermal gradient. In the embodiment shown in the drawing, these two shells are joined on their bottom surface to a collector bottom 78 traversed by supports 34c and 38d in the form of cylindrical skirts, which are off-centred relative to the vessel and fixed to vessel bottom 12a. Pumps 34 and exchangers 38 can easily be centred by supports 34c and 38d. The diagrid 28 is supported by the vessel bottom 12a through the skirt 30 submitted to the thermal gradient in zone N1-N3. For ensuring a high stability with respect to lateral forces such as seismic forces, said skirt has preferably a conical shape.

Among the advantages of the fast neutron reactor with a cold bottom according to the invention are in particular the simplicity and significantly reduced cost of the structures compared with those of reactors with a suspended vessel. Thus, it has already been pointed out that the elimination of the supporting function for the vertical wall of vessel 12 makes it unnecessary to air condition the said wall at 400° C., as in the prior art reactors. As a result there is no need to use the hitherto employed costly baffles. Moreover, the cold bottom 12a, which is quasi-isothermal and which is normally only exposed to very limited stresses, can be made from ordinary steel without any risk of decarbonization, because it is only in contact with cold or even frozen sodium. The same applies regarding skirt 64, whose thickness need only be 35 to 40 mm, whereas the thickness of the bottom 12a is, for example, 50 mm. As a result of the present invention the pumps and exchangers, which are centred at the top and bottom are much easier to construct. In this connection it should be noted that pumps 34 can be immersed to a relatively low level, making it unnecessary to laterally thermally protect them by an argon layer. Moreover, the vessel and all the internal members centred in the lower part, acquire a considerable robustness and stability, particularly in the case of seismic movements. This robustness makes it possible to envisage larger vessel diameters allowing the installation in the vessel of appropriately protected steam generators, whilst eliminating secondary circuits, leading to considerable economies and a greatly reduced seismic sensitivity.

Finally a detailed analysis will be made hereinafter of the safety characteristics of such a reactor, which would appear to be particularly good.

It is firstly surprising that the cold bottom 12a of the vessel in this case only constitutes a single protective barrier, whereas generally at least two barriers are required between the primary vessel and the air inside or outside the building. As indicated hereinbefore this features, which also leads to greater simplicity and lower cost compared with known reactors, is justified by the fact that the cold bottom 12a is normally covered with frozen sodium. This sodium has a tight sealing action, is not activated because it is stationary after loading into the vessel and forms a tight barrier as a result of the permanent cooling source. Moreover the use of a single cold bottom 12a is justified by the fact that it is only exposed to limited thermal stresses, it can have a considerable thickness and it rests on regularly distributed supports 54. In addition, the construction of the vessel bottom from ordinary steel instead of stainless steel further reduces expansions.

The presence of a single vessel bottom is also justified by its accessibility for inspection and repair purposes. Industrial experience with the Phénix reactor has shown that on shutdown the radioactive level in contact with the vessel can enable personnel to have access, at least during the first few years. In the reactor according to the invention the vessel is better protected that in the Phénix reactor due to the considerable thickness of the sodium and the stagnation thereof. Obviously devices which have not been described here make it necessary, if required, to renew the lower sodium layer by maintaining a lower activation thereof. Thus, throughout operation access can be obtained to the bottom on shutdown. Remotely controlled inspection of the bottom is also very favourable because it remains cold in operation. Moreover, the air cooling proposed in the present embodiment is very reliable, particularly if it is duplicated by natural circulation. Thus, on the other hand a possible sodium leak in normal operation can take place at low temperature and consequently without any danger of sodium ignition in the cooling air, and on the other hand if an accident occurred which led to the partial fusion of the core 24, the receiver or stop plate 32 would be adequately cooled to prevent any detrimental effect on bottom 12a. It is pointed out in this connection that in the case of such accidents the possible sliding of bottom 12a on supports 54 makes it possible to very significantly reduce the forces supported by the vessel as a result of its expansion. In the hypothetical case of a perforation of bottom 12a leading to a small sodium leak into the air circulating in space 56, the sodium escaping from the vessel would, as a result of the conical shape of bottom 12a fill the annular space defined between ferrules 68 and 72. Thus, when the sodium became level with the upper edge of ferrule 72 a siphon would be created blocking the circulation of the air in space 56. Thus, combustion is limited by the quantity of oxygen present. Moreover, an automatic device can control the sealing of the cooling circuit from the bottom. Finally and as stated hereinbefore, space 56 forms the lower part of the cooling circuit, so that in the case of a perforation of bottom 12a the sodium leak would stop when space 56 was filled and the heat of core 24 would then continue to be evacuated by not shown ancillary cooling means, which could be placed on the vessel periphery. Thus, the elimination of the baffles necessary for the air conditioning to 400° C. of the side wall of the prior art reactors permits a lateral evacuation of the residual power in the case of an accident.

Thus, the reactor according to the present invention offers essential advantages compared with the prior art fast neutron reactors.

What is claimed is:

1. A nuclear reactor cooled by a liquid metal comprising:
    a vessel shaft having a bottom;
    a liquid metal-filled cylindrical vessel located within said vessel shaft and having a bottom which rests on the bottom of said vessel shaft;
    lower supports between said vessel shaft bottom and said vessel bottom;
    a slab sealing off said vessel;
    means for externally insulating a lateral wall of said vessel;
    a reactor core inside said vessel and cooled by liquid metal;
    a diagrid supporting said reactor core;
    upper supports between said vessel bottom and said diagrid;
    at least one heat exchanger ensuring a transmission to a secondary fluid of heat from hot liquid metal flowing out from said core;
    at least one pump providing a forced flow of liquid metal in inner areas of the vessel, comprising said core and said heat exchanger; and
    means for cooling the bottom of said vessel to a temperature close to the ambient temperature; said inner areas being entirely located above a given horizontal plane, the height of which above said vessel bottom is at least 1/10 of a diameter of said vessel, thus providing below said plane an extended, thermally stratificated static layer of liquid metal, which submits a lower part of said lateral wall and said upper supports to an extended thermal gradient and therefore to acceptable thermal stresses, and which provides an acceptable limitation of thermal losses in direction of said cooled bottom.

2. A nuclear reactor cooled by a liquid metal, comprising:
    a vessel shaft having a bottom;
    a liquid metal-filled vessel located within said vessel shaft and having a bottom which rests on the bottom of said vessel shaft;
    lower supports between said vessel shaft bottom and said vessel bottom;
    a slab sealing off said vessel;
    means for externally insulating a lateral wall of said vessel;
    a reactor core inside said vessel and cooled by liquid metal;
    a diagrid and a support member for supporting said reactor core on the bottom of said vessel;
    at least one heat exchanger ensuring a transmission to a secondary fluid of heat from hot liquid metal flowing out from said core;
    at least one pump providing a forced flow of liquid metal in inner areas of the vessel, comprising said core and said heat exchanger; and means for cooling the bottom of said vessel to a temperature close to the ambient temperature;
said inner areas being entirely located above at least approximately 2.5 m of static liquid metal rising above the bottom of the vessel, thus providing an extended, thermally stratificated static layer of liquid metal which submits a lower part of said lateral wall to an extended thermal gradient and therefore to acceptable thermal stresses, and which provides an acceptable limitation of thermal losses in direction of said cooled bottom.

3. A nuclear reactor cooled by a liquid metal, comprising
    a vessel shaft having a bottom;
    a liquid metal-filled vessel located within said vessel shaft and having a bottom which rests on the bottom of said vessel shaft by means of supports forming between the said bottoms a space;
    a reactor core contained within said vessel;
    a sealing slab sealing off said vessel;
    at least one heat exchanger ensuring a transmission of heat from said liquid metal to a secondary fluid;
    pump means for providing a forced flow of liquid metal between said reactor core and said heat exchanger, said forced flow being entirely located within said vessel above a given height of static liquid metal rising above the bottom of the vessel; and
    means for cooling the bottom of the vessel to a temperature close to ambient temperature comprising a cooling fluid circulating in said space; said space being vertically subdivided into a lower space and an upper space by a fairing, the outer periphery of the lower space being supplied with said cooling fluid by means of an intake pipe, the inner periphery of the lower space communicating with the upper space, said cooling fluid being discharged at the outer periphery of the upper space by at least one discharge pipe, the upper space having a smaller height than the lower space.

4. A nuclear reactor according to claim 3, wherein the fairing can be dismantled to enable the vessel bottom to be inspected.

5. A nuclear reactor according to claim 3 or 4, wherein the inner periphery of both the upper and lower spaces is linked by a baffle, which can fill with a liquid metal in the case of a vessel leak in order to form a siphon stopping the circulation of the cooling fluid.

6. A nuclear reactor according to claim 1, wherein the bottom of the vessel rests on the bottom of the vessel shaft by means of supports forming between the said bottoms a space in which circulates a cooling fluid defining the said means for cooling the bottom of the vessel.

7. A nuclear reactor according to claim 6, wherein the bottom of the vessel is substantially conical and rests on the supports by gravity.

8. A nuclear reactor according to claim 6, wherein said space is vertically subdivided into a lower space and an upper space by a fairing, the outer periphery of the lower space being supplied with said cooling fluid by means of an intake pipe, the inner periphery of the lower space communicating with the upper space, said cooling fluid being discharged at the outer periphery of the upper space by at least one discharge pipe, the upper space having a smaller height than the lower space.

9. A nuclear reactor according to claim 8, wherein the fairing can be dismantled to enable the vessel bottom to be inspected.

10. A nuclear reactor according to claim 8, wherein the inner periphery of both the upper and lower spaces is linked by a baffle, which can fill with a liquid metal in the case of a vessel leak in order to form a siphon stopping the circulation of the cooling fluid.

11. A nuclear reactor according to claim 1, wherein said inner areas further comprise said pump and there is provided a collector receiving cooled metal liquid cooled from discharge ports of said heat exchanger, said pump supplying said cooled metal liquid to the reactor core, screens being placed within the collector below said discharge ports of the heat exchanger and substantially level with said given horizontal plane, whereby said collector contains static liquid metal below said screens.

12. A nuclear reactor according to claim 11, wherein the static liquid metal contained in the vessel is cooled by said means for cooling the bottom of the vessel to a temperature such that the lower part of the metal is in a solid state.

13. A nuclear reactor according to any one of claims 1 or 11, wherein thermally insulated inclusions are provided below said given plane and have a thermal conductivity below that of the liquid metal, so as to limit the downward heat flux over said height.

14. A nuclear reactor according to any one of claims 1 or 11, wherein said vessel is connected to the slab by meas of an expansion bellows with bending corrugations.

15. A nuclear reactor according to any one of claims 1 or 11, wherein a skirt surrounds said vessel and rests on the bottom of the vessel shaft so as to support the slab.

* * * * *